United States Patent
Dupre et al.

(10) Patent No.: US 11,460,127 B2
(45) Date of Patent: Oct. 4, 2022

(54) METHOD FOR CONTROLLING BUCKLING IN DEEPWATER PIPELINE WITH INCLINED SLEEPERS

(71) Applicant: SHELL OIL COMPANY, Houston, TX (US)

(72) Inventors: Michael Hosokawa Dupre, Houston, TX (US); Kevin Ouyang, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/209,560

(22) Filed: Mar. 23, 2021

(65) Prior Publication Data

US 2021/0301945 A1 Sep. 30, 2021

Related U.S. Application Data

(60) Provisional application No. 62/994,525, filed on Mar. 25, 2020.

(51) Int. Cl.
    *F16L 1/16* (2006.01)
    *F16L 1/235* (2006.01)
    *F16L 1/20* (2006.01)

(52) U.S. Cl.
    CPC ............... *F16L 1/16* (2013.01); *F16L 1/201* (2013.01); *F16L 1/235* (2013.01)

(58) Field of Classification Search
    CPC ...................................... F16L 1/20; F16L 3/20
    USPC ............................................. 405/168.1, 168.2
    See application file for complete search history.

(56) References Cited

U.S. PATENT DOCUMENTS

| | | | | |
|---|---|---|---|---|
| 3,690,111 A | * | 9/1972 | Matthews, Jr. | ........... F16L 1/18 405/166 |
| 2006/0127622 A1 | * | 6/2006 | Mohan | ..................... F16L 58/10 428/36.91 |
| 2008/0152433 A1 | | 6/2008 | Monti et al. | |
| 2014/0023440 A1 | * | 1/2014 | Early | ...................... F16L 57/02 405/168.2 |

OTHER PUBLICATIONS

Sun et al., "Thermal Expansion/Global Buckling Mitigation of HPHT Deepwater Pipelines, Sleeper or Buoyancy", Proceedings of the Twenty-second (2012) International Offshore and Polar Engineering Conference Rhodes, Jun. 17-22, 2012, pp. 222-231.
Carneiro et al., "Buckle Initiation and Walking Mitigation for HP/HT Pipelines", Deep Offshore Technology International Monte Carlo, Monaco Nov. 3-5, 2009, 17 pages.

* cited by examiner

*Primary Examiner* — Sean D Andrish
(74) *Attorney, Agent, or Firm* — Shell USA, Inc.

(57) ABSTRACT

A method for controlling buckling in subsea pipelines involves identifying spaced-apart sections of a subsea pipeline suitable for controlled lateral buckling. Sets of inclined sleepers are installed at each spaced-apart section and are selected to support the spaced-apart sections of the subsea pipeline in an orientation that is perpendicular to the initial as-laid position. Any buckling caused by thermal expansion of the subsea pipeline is distributed to two or more of the spaced-apart sections, causing the two or more spaced-apart sections to deflect laterally along the inclined sleepers outwardly from an initial as-laid position.

19 Claims, 4 Drawing Sheets

METHOD FOR CONTROLLING BUCKLING IN DEEPWATER PIPELINE WITH INCLINED SLEEPERS

CROSS REFERENCE TO RELATED APPLICATIONS

This application claims priority benefit of U.S. Provisional Application No. 62/994,525 filed Mar. 25, 2020, which is incorporated herein by reference in its entirety.

FIELD OF THE INVENTION

The present invention relates to a method for controlling buckling due to thermal expansion and, more specifically, to controlling buckling of deepwater pipelines with inclined sleepers.

BACKGROUND OF THE INVENTION

As subsea production of oil and gas moves to greater depths, the effects of temperature and pressure become more challenging. The challenges are exacerbated by increasing pipeline lengths.

For example, in the Gulf of Mexico, production wells are deployed in water depths of 5,000 to 10,000 ft (1,500 to 3,000 m), even up to 15,000 ft (4,500 m). Accordingly, pipelines are subjected to High Pressure High Temperature (HPHT) conditions, for example, 10,000 to 20,000 psi (70 to 140 MPa) and 300° F. to 400° F. (150° C. to 200° C.). HPHT causes expansion of pipelines and, if expansion is restrained, for example by friction of the seabed, undesirable compressive axial forces are developed. When the force is large enough, the pipeline will buckle, potentially leading to fatigue, fracture, stress cracks, and/or rupture of the pipeline. Expansion and contraction of subsea pipelines may be caused by cycles of production start-up and shut-down, as an example.

Traditionally, the industry has controlled thermal buckling by trenching and burying the pipeline, using overburden to constrain buckling. However, under increased HPHT conditions and greater depths and lengths, the required overburden load is uneconomical. Accordingly, efforts have been made by the industry to artificially induce buckles in the pipeline.

One method for triggering buckles is to locally place a vertical upset of a pipeline through so-called sleepers. Sun et al ("*Thermal Expansion/Global Buckling Mitigation of HPHT Deepwater Pipelines, Sleeper or Buoyancy?*" Proceedings of the Twenty-second (2012) International Offshore and Polar Engineering Conference Rhodes, Greece, Jun. 17-22, 2012) illustrates an example of a typical sleeper deployment, wherein a total of 29 sleepers were installed for a 54 km long flowline loop. The sleepers were 32 inches (0.81 m) high and spaced apart at a distance from 2952 to 8200 ft (900 to 2500 m).

Carneiro et al ("*Buckle Initiation and Walking Mitigation for HP/HT Pipelines*" Deep Offshore Technology International Monte Carlo, Monaco 3-5 Nov. 2009) describes a dual sleeper system where sets of dual sleepers are spaced 1.3-2.0 km apart. As described, the solution involves installing two sleepers, which are sections of large diameter pipe pre-installed perpendicularly to the pipeline routes. The sleepers were 0.8 m high and spaced 20 m apart.

Conventional sleepers, such as the type described by Sun et al and Carneiro et al, are laid flat on the sea floor, typically at some height above the seafloor.

US2008/0152433A1 (Monti et al) relates to a method for triggering and controlling the lateral buckling of underwater pipelines by providing an elevated support structure having a lattice framework. The structure must be supported with a suitable foundation, for example mud-mats or suction piles. The upper surface of the support structure is inclined at an angle of 3 to 30 degrees. The structure may be equipped with supporting rollers to achieve a desired coefficient of friction.

There is a need for an improved method for controlling buckling of a deepwater pipeline that preferentially results in a one-wave deformation with reduced bending stresses, for example that are caused by using an elevated sleeper or support structure.

SUMMARY OF THE INVENTION

According to one aspect of the present invention, there is provided a method for controlling buckling in subsea pipelines, comprising the steps of: providing a subsea pipeline on a seafloor, the subsea pipeline having an initial as-laid position; identifying a plurality of spaced-apart sections of the subsea pipeline suitable for controlled lateral buckling; installing a set of inclined sleepers at each spaced-apart section in an orientation that is perpendicular to the initial as-laid position, each of the inclined sleepers in the set of inclined sleepers installed in a spaced-apart relationship; wherein a set of inclined sleepers has at least three inclined sleepers comprising an upstream inclined sleeper, a central inclined sleeper, and a downstream inclined sleeper, and the length of each inclined sleeper is selected to accommodate a projected lateral deformation relative to the initial as-laid position; whereby any buckling caused by thermal expansion of the subsea pipeline is distributed to two or more of the spaced-apart sections, causing the two or more spaced-apart sections to deflect laterally along the inclined sleepers, outwardly from the initial as-laid position.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

Figure 1:
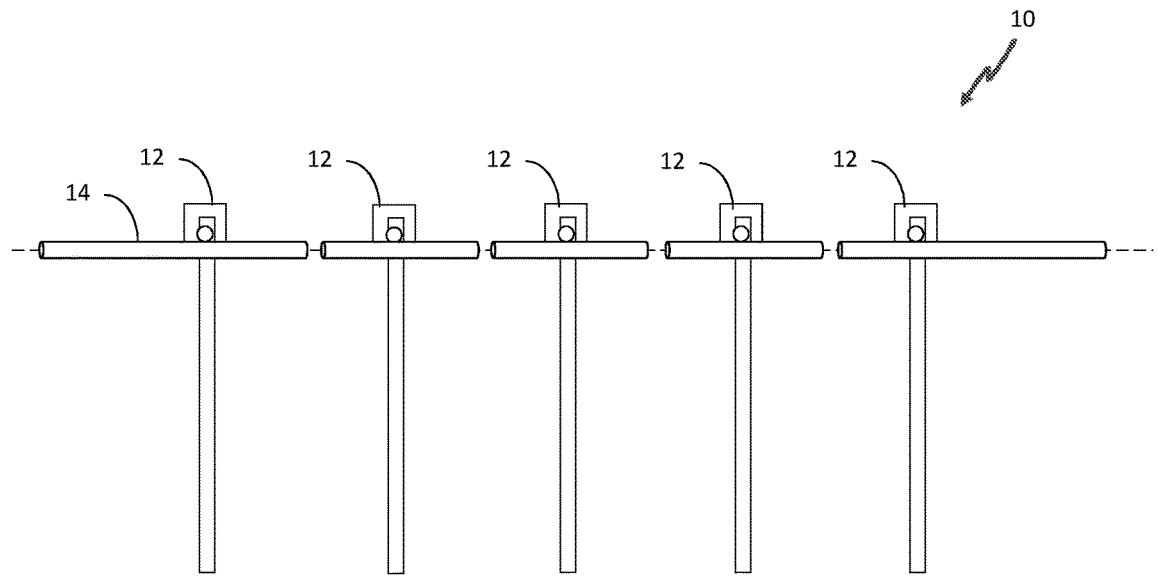
FIG. 1 is a top plan view of one embodiment of a set of inclined sleepers supporting a subsea pipeline.

The present invention provides a method for controlling buckling in subsea pipelines, particularly for deepwater pipelines at a depth in a range of from 5,000 to 15,000 ft (1,500 to 4,500 m). The method of the present invention is suitable for pipelines subjected to a pressure in a range of from 5,000 to 20,000 psi (35 to 140 MPa) and a temperature in a range of from 300° F. to 400° F. (150° C. to 200° C.).

In accordance with the method of the present invention, the method of the present invention overcomes the disadvantages of conventional sleepers by providing sets of inclined sleepers that reduce bend stresses and provide a location for a supported one-wave deformation. Any buckling caused by thermal expansion of the subsea pipeline is distributed to two or more spaced-apart sections of pipeline, so that the sections deflect laterally along the inclined sleepers, outwardly from an initial as-laid position. While the buckling occurs in a raised position relative to the seafloor, having multiple sleepers generates a longer buckle profile, thereby reducing bending stresses that occur, for example, with single sleepers and dual sleepers that are spaced close to one another. Reduced bending stress reduces the associated fatigue. In addition, having inclined sleepers, oriented to incline in the same direction, forces a low mode buckle profile that has less curvature than a high mode buckle profile.

The subsea pipeline may be laid according to conventional techniques, including, without limitation, an S-lay, J-lay or reel-lay process. The pipeline may be laid, for example, without limitation, in a straight or snake configuration. The pipeline may be laid on pre-installed sets of inclined sleepers. For example, a rope or cable extending from the pipeline laying vessel may be used to pull the pipeline to the desired initial as-laid pipeline location on the inclined sleepers.

Finite Element Analysis (FEA) tools, such as, for example, without limitation, ABAQUS®, and/or other analytical tools are conventionally used by those skilled in the art to determine thermal mitigation effectiveness and reliability analysis when determining specifications of subsea pipelines and related components. Such tools are used to determine a proposed spacing between sets of inclined sleepers and to ensure that planned buckling occurs at the identified sections of pipeline and that no unplanned (rogue) buckling occurs between mitigation locations for various operating conditions. Preferably, the proposed sections are then inspected for local conditions, such as, for example, presence of rocks, spans for ditches, unique installation stresses, seabed slopes, changes in soil type, and the like. The inclined sleepers may then be installed or the proposed locations may be redesigned using the FEA tool or other analysis, followed by inspection and installation. Inspection may be done, for example, using an ROV (remotely operated vehicle) or AUV (autonomous underwater vehicle).

In accordance with the present invention, a plurality of spaced-apart sections of the subsea pipeline are identified as being suitable for controlled lateral buckling. The spacing of the sets of inclined sleepers is selected according to operating conditions. The spaced-apart sections preferably have a center-to-center distance in a range of from 2,000 to 10,000 ft (600 to 3,000 m), more preferably at a center-to-center distance in a range of from 3,000 to 5,000 feet (900 to 1500 m), even more preferably at a center-to-center distance in a range of from 2,500 to 4,500 ft (760 to 1,400 m).

At each section of the subsea pipeline identified for controlled buckling, a set of inclined sleepers are installed in a spaced-apart relationship and in a perpendicular orientation to the initial as-laid position of the pipeline. The set of inclined sleepers has at least three inclined sleepers, including an upstream inclined sleeper that is relatively closer to a well and a downstream inclined sleeper that is relatively closer to production vessel or platform. Spaced between the upstream inclined sleeper and the downstream sleeper is at least one central inclined sleeper. Preferably, each set of inclined sleepers has from 3 to 10 inclined sleepers, more preferably from 3 to 7 inclined sleepers. In a preferred embodiment, each set of inclined sleepers has 5 inclined sleepers. The inclined sleepers are installed in a spaced-apart relationship at a center-to-center distance in a range of from 40 to 100 ft (12 to 30 m).

The length of the inclined sleeper is selected to accommodate a projected lateral deformation relative to the initial as-laid position of the subsea pipeline. By "projected lateral deformation" we mean the maximum distance from an initial as-laid position that is expected at maximum thermal expansion conditions during operation plus (a) a tolerance factor to account for additional length at the lower end of the sleeper so that the pipeline does not buckle beyond the lower end of the sleeper and (b) a deviation factor to account for any deviations from the initial as-laid position when the pipeline undergoes thermal contraction.

FIG. 1 illustrates an embodiment of the present invention 10, wherein a set of five inclined sleepers 12 is installed on the seafloor in a perpendicular orientation to an as-laid subsea pipeline 14. Each of the inclined sleepers 12 within the set are spaced-apart at a center-to-center distance of 40 to 100 feet (12 to 30 m). In the embodiment illustrated in FIG. 1, the sleepers are equal in length.

Figure 2:
FIG. 2 is a side elevation view of one embodiment of the embodiment of FIG. 1, wherein the inclination angle of each sleeper is the same.

Preferably, the inclined sleepers are positioned such that the initial as-laid position of the pipeline is at an upper end of the central inclined sleeper as shown in FIG. 2. This allows for reduced bending stresses that would increase with height above the seafloor, while providing sufficient length to accommodate the projected lateral deformation.

In accordance with the present invention, any buckling caused by thermal expansion of the subsea pipeline is distributed to two or more of the spaced-apart sections, causing the two or more spaced-apart sections to deflect laterally along the seafloor outwardly from the initial as-laid position. In practice, the inventors have found that the lateral deflection is substantially equally distributed to each of the spaced-apart sections of pipeline 14. In accordance with the present invention, the lateral movement of pipeline along the inclined sleepers and in spaced-apart sections of pipeline allows controlled buckling of the pipeline in at least two sections of the pipeline in response to thermal expansion.

The inventors have discovered that the method of the present invention allows for lateral deformation of the sections of subsea pipeline 14 during hot cycles and that, during cold cycles, the sections of subsea pipeline 14 gradually return substantially to the as-laid position of the section of pipeline 14.

The upstream inclined sleeper has an upstream inclination angle, the central inclined sleeper has a central inclination angle, and the downstream inclined sleeper having a downstream stream inclination angle. In one embodiment, illustrated in FIG. 2, the upstream inclination angle, the central inclination angle and the downstream inclination angle are the same. Preferably, the inclined sleepers have an inclination angle in a range from 3 degrees to 15 degrees, more preferably from 3 degrees to 10 degrees, most preferably from 5 degrees to 7 degrees, relative to the seafloor. Preferably, the inclined sleepers are oriented to incline in the same direction, as illustrated in the drawings.

Figure 3:
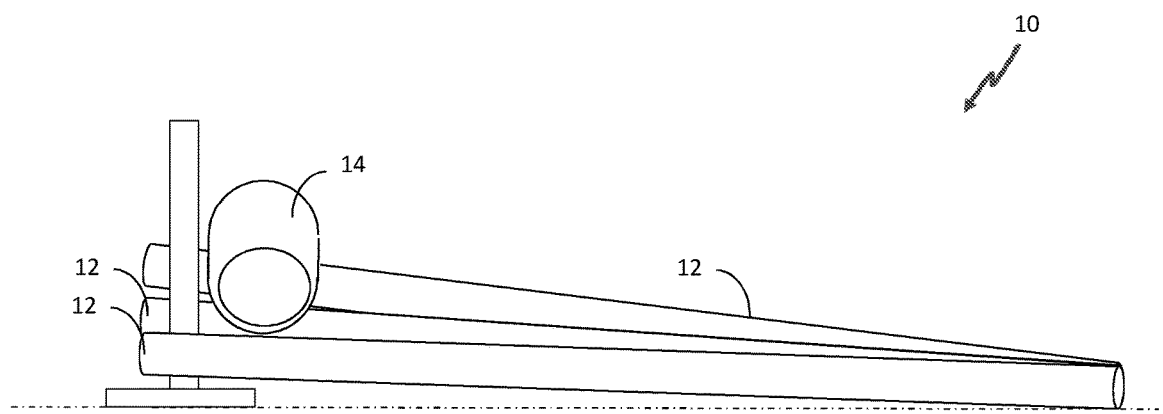
FIG. 3 is a side elevation view of another embodiment of the embodiment of FIG. 1, wherein the inclination angle of a central inclined sleeper is greater than that of the upstream inclined sleeper.

In another embodiment, illustrated in FIG. 3, the inclination angle of the central inclined sleeper 12 is greater than the inclination angle of the upstream inclination angle. In this embodiment, the central inclination angle is preferably in a range from 3 degrees to 15 degrees, more preferably from 3 degrees to 10 degrees, most preferably from 5 degrees to 7 degrees, relative to the seafloor. Where there is more than one central inclined sleeper 12, the inclination angle of the central inclined sleepers 12 may be the same or different. The upstream inclination angle and the downstream inclination angle are preferably and independently in a range of from 1 to 10 degrees, more preferably from 3 degrees to 7 degrees, most preferably from 3 degrees to 5 degrees, relative to the seafloor.

Figure 4:
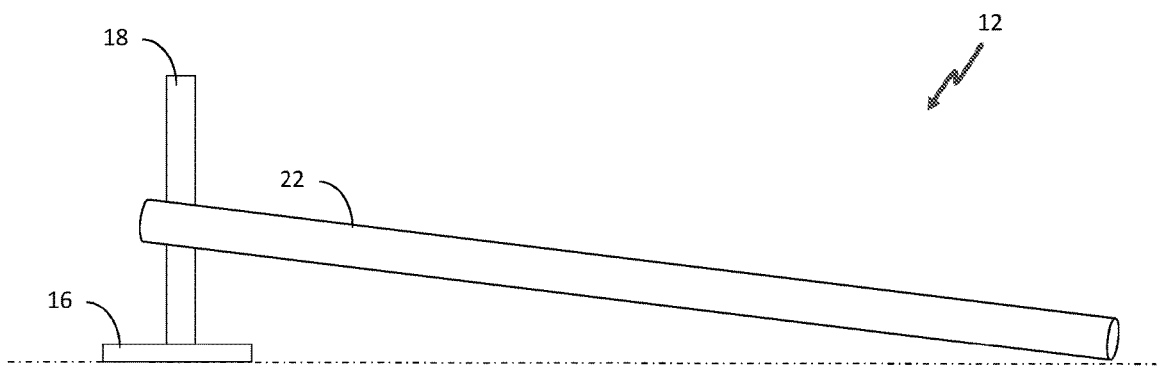
FIG. 4 is a side elevation view of one embodiment of an inclined sleeper in the set of inclined sleepers depicted in the embodiment in FIG. 1.

One embodiment of an inclined sleeper 12 of the present invention is illustrated in FIG. 4. The inclined sleeper 12 has a base 16 and an upwardly extended post 18. The base 16 may be in the form of a mud mat or a plate that is held in place by anchoring, for example, with a mud mat. An inclined crossmember 22 is supported on the post 18 at a height for achieving the desired inclination angle. For example, the inclined crossmember 22 may have a hole or slot for slidably receiving the post 18. In the embodiment shown, the post 18 is has a circular cross-section with a uniform diameter. However, the post 18 may have a different cross-sectional shape, for example, square or rectangular. Also, the post 18 may have a smaller diameter at top. For example, the post 18 may have a top section of a smaller diameter and a bottom section of a larger diameter, thereby creating a shoulder stop (not shown) for supporting the inclined crossmember 22. Alternatively, the post 18 may be provided with a collar (not shown) placed at the desired height for stopping downward travel of the inclined crossmember 22. Alternatively, the post and crossmember may be welded together.

As shown in FIG. 4, the crossmember 22 is advantageously a tubular member. However, other cross-sectional shapes are possible. The diameter of the crossmember 22 should be selected to support the pipeline weight and movement thereof. Advantageously, the crossmember 22 is equal to or similar to the diameter and wall thickness of the pipeline 14.

The inclined sleepers 12 are advantageously provided with cathodic protection devices (not shown) and grounding straps (not shown).

Figure 5:
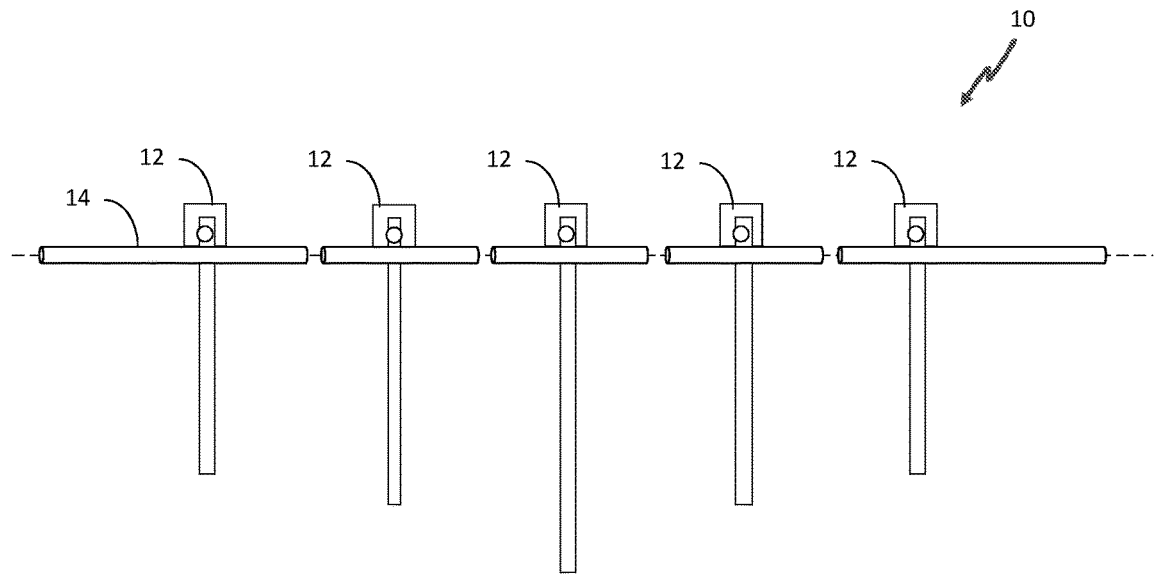
FIG. 5 is a top plan view of another embodiment of a set of inclined sleepers supporting a subsea pipeline.

FIG. 5 illustrates another embodiment of the present invention 10, wherein a set of five inclined sleepers 12 is installed on the seafloor in a perpendicular orientation to an as-laid subsea pipeline 14. Each of the inclined sleepers 12 within the set are spaced-apart at a center-to-center distance of 40 to 100 feet (12 to 30 m). In the embodiment illustrated in FIG. 5, the central inclined sleeper is longer in length than the upstream inclined sleeper and the downstream inclined sleeper. In the embodiment of FIG. 5, there are three central inclined sleepers, wherein the most central is longer in the length than the central inclined sleepers on either side thereof. This correspond to the shape of the projected lateral deformation relative to the initial as-laid position. However, it is possible that each of the central inclined sleepers is the same length.

Figure 6:
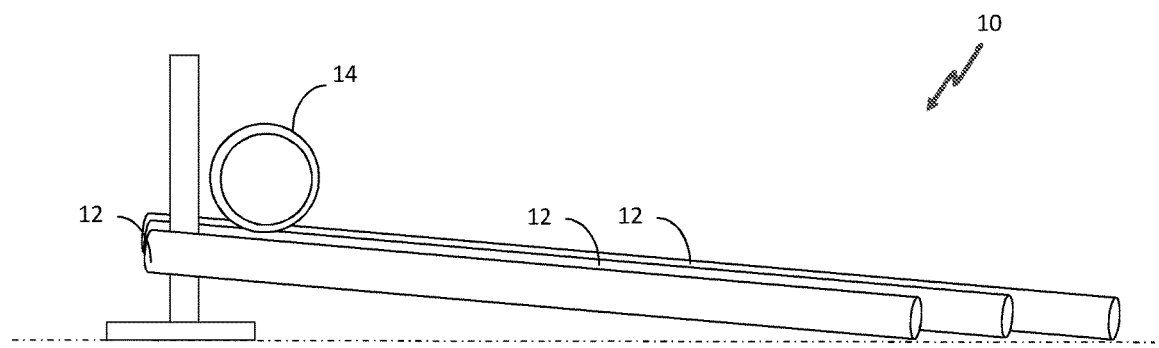
FIG. 6 is a side elevation view of one embodiment of the embodiment of FIG. 5, wherein the inclination angle of each sleeper is the same.
Figure 7:
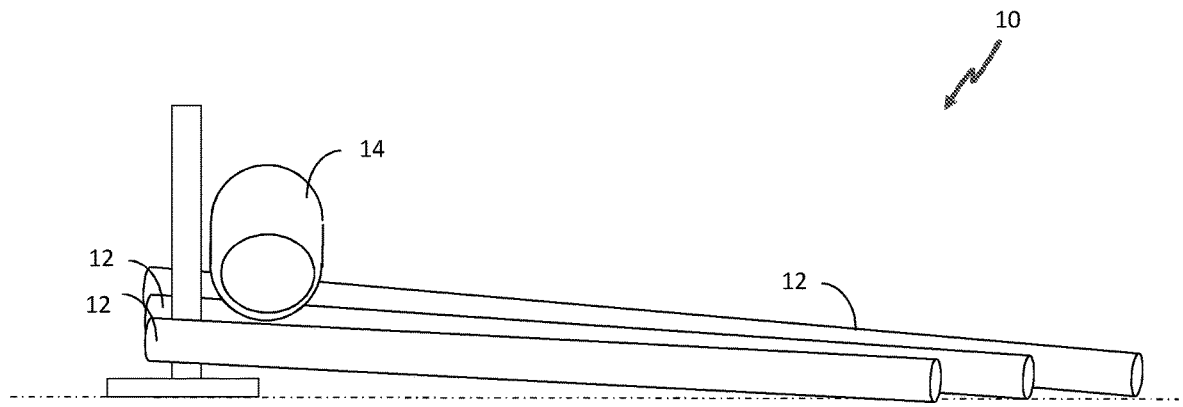
FIG. 7 is a side elevation view of another embodiment of the embodiment of FIG. 5, wherein the inclination angle of a central inclined sleeper is greater than that of the upstream inclined sleeper.

In one embodiment, illustrated in FIG. 6, the upstream inclination angle, the central inclination angle and the downstream inclination angle are the same. In another embodiment, illustrated in FIG. 7, the inclination angle of the central inclined sleeper 12 is greater than the inclination angle of the upstream inclination angle.

Figure 8:
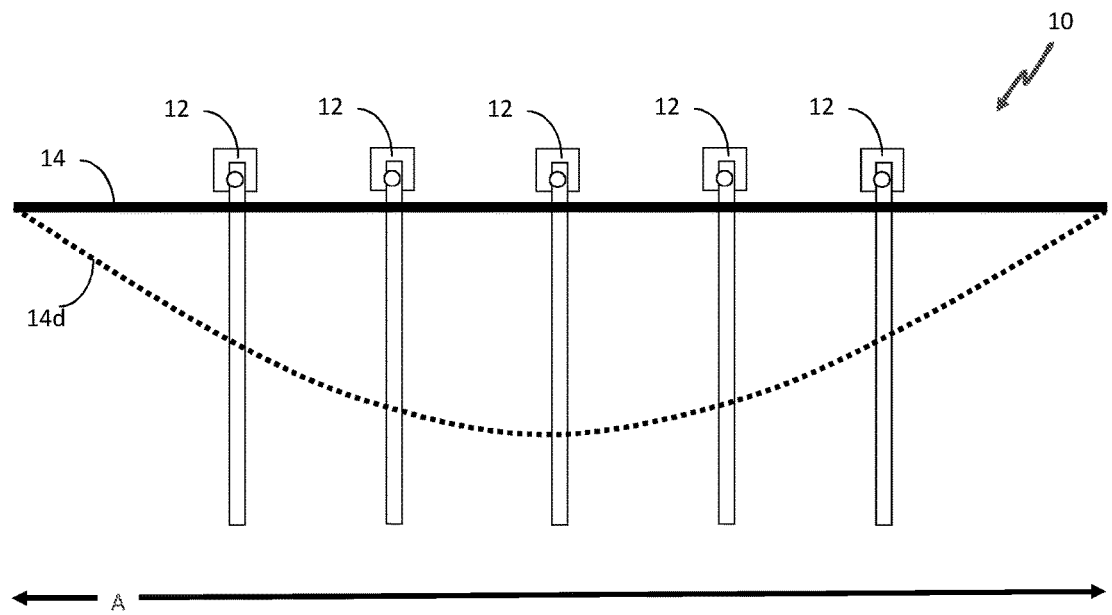
FIG. 8 is a top plan view of the expected performance of the method of the present invention.

Without being bound by theory, it is expected that the method of the present invention will perform as illustrated in FIG. 8. In FIG. 8, the inclined sleepers 12 are of equal length and with a central inclination angle of 5 degrees. The inclined sleepers 12 are spaced approximately 60 ft (18 m) apart. Using ABAQUS®, the projected lateral deformation was expected to be about 40 ft (12 m) plus a tolerance factor of 5 feet (1.5 m) and a deviation factor of 5 ft (1.5 m). Accordingly, the inclined sleepers 12 had a length of 50-100 ft (15-30 ft) to place the initial as-laid pipeline position at the upper end of the central inclined sleeper 12. With cycling through hot and cold cycles, at HPHT conditions, the inventors expect buckling at the illustrated section of pipeline to have a buckle length A (for example, 500 ft (150 m)) and a lateral deflection along the inclined sleepers, downwardly and outwardly from the initial as-laid position to a deflected position 14d.

While preferred embodiments of the present invention have been described, it should be understood that various changes, adaptations and modifications can be made therein within the scope of the invention(s) as claimed below.

What is claimed is:

1. A method for controlling buckling in subsea pipelines, comprising the steps of:
providing a subsea pipeline on a seafloor, the subsea pipeline having an initial as-laid position;
identifying a plurality of spaced-apart sections of the subsea pipeline suitable for controlled lateral buckling;
installing a set of inclined sleepers at each spaced-apart section in an orientation that is perpendicular to the initial as-laid position, each of the inclined sleepers in the set of inclined sleepers installed in a spaced-apart relationship;
wherein the set of inclined sleepers has at least three inclined sleepers comprising an upstream inclined sleeper, a central inclined sleeper, and a downstream inclined sleeper, and a length of each inclined sleeper is selected to accommodate a projected lateral deformation relative to the initial as-laid position;
wherein the length of the central inclined sleeper is longer than the length of the upstream and downstream inclined sleepers, corresponding to a shape of the projected lateral deformation relative to the initial as-laid position;
whereby any buckling caused by thermal expansion of the subsea pipeline is distributed to two or more of the spaced-apart sections, causing the two or more spaced-apart sections to deflect laterally along the inclined sleepers, outwardly from the initial as-laid position.

2. The method of claim 1, wherein the initial as-laid position is at an upper end along the length of the central inclined sleeper.

3. The method of claim 1, wherein the at least three inclined sleepers are oriented in the same inclined direction.

4. The method of claim 1, wherein the inclined sleepers have an inclination angle in a range from 3 degrees to 15 degrees, relative to the seafloor.

5. The method of claim 1, wherein the inclined sleepers have an inclination angle in a range from 3 degrees to 10 degrees, relative to the seafloor.

6. The method of claim 5, wherein a central inclination angle is in a range from 3 degrees to 15 degrees, relative to the seafloor.

7. The method of claim 5, wherein a central inclination angle is in a range from 3 degrees to 10 degrees, relative to the seafloor.

8. The method of claim 5, wherein a central inclination angle is in a range from 5 degrees to 7 degrees, relative to the seafloor.

9. The method of claim 5, wherein an upstream inclination angle and a downstream inclination angle are independently in a range of from 1 to 10 degrees, relative to the seafloor.

10. The method of claim 5, wherein an upstream inclination angle and a downstream inclination angle are independently in a range of from 3 degrees to 7 degrees, relative to the seafloor.

11. The method of claim 5, wherein an upstream inclination angle and a downstream inclination angle are independently in a range of from 3 degrees to 5 degrees, relative to the seafloor.

12. The method of claim 1, wherein the inclined sleepers have an inclination angle in a range from 5 degrees to 7 degrees, relative to the seafloor.

13. The method of claim 1, wherein the upstream inclined sleeper has an upstream inclination angle, the central inclined sleeper has a central inclination angle, and the downstream inclined sleeper having a downstream stream inclination angle, wherein the central inclination angle relative to the seafloor is greater than one or both of the upstream inclination angle and the downstream inclination angle.

14. The method of claim 1, wherein the subsea pipeline is deployed on the seafloor at a depth in a range of from 5,000 to 15,000 ft (1,500 to 4,500 m).

15. The method of claim 1, wherein the spaced-apart sections of the subsea pipeline are spaced at a center-to-center distance in a range of from 2,000 to 10,000 feet (600 to 3,000 m).

16. The method of claim 1, wherein the set of inclined sleepers has from 3 to 10 inclined sleepers.

17. The method of claim 1, wherein the set of inclined sleepers has from 3 to 7 inclined sleepers.

18. The method of claim 1, wherein each inclined sleeper in the set of inclined sleepers is installed in a spaced-apart relationship at a center-to-center distance in a range of from 40 to 100 feet (12 to 30 m).

19. The method of claim 1, wherein the subsea pipeline is subjected to pressures in a range of from 5,000 to 20,000 psi (35 to 140 MPa) and a temperature in a range of from 300° F. to 400° F. (150° C. to 200° C.).

* * * * *